US011203871B2

(12) United States Patent
Duque et al.

(10) Patent No.: US 11,203,871 B2
(45) Date of Patent: *Dec. 21, 2021

(54) MULTI-LAYERED CAP SHINGLE WITH ENHANCED WIND PERFORMANCE AND METHOD OF MAKING SAME

(71) Applicant: Building Materials Investment Corporation, Dallas, TX (US)

(72) Inventors: Luis Duque, Hackensack, NJ (US); Ming-Liang Shiao, Basking Ridge, NJ (US); Sudhir Railkar, Wayne, NJ (US)

(73) Assignee: BMIC, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,005

(22) Filed: Jun. 29, 2020

(65) Prior Publication Data
US 2020/0325684 A1 Oct. 15, 2020

Related U.S. Application Data

(63) Continuation of application No. 15/617,183, filed on Jun. 8, 2017, now Pat. No. 10,787,814.
(Continued)

(51) Int. Cl.
*E04B 2/00* (2006.01)
*E04D 1/30* (2006.01)
(Continued)

(52) U.S. Cl.
CPC ................ *E04D 1/30* (2013.01); *B32B 5/022* (2013.01); *B32B 7/14* (2013.01); *E04D 1/20* (2013.01);
(Continued)

(58) Field of Classification Search
None
See application file for complete search history.

(56) References Cited

U.S. PATENT DOCUMENTS

4,189,886 A * 2/1980 Frohlich .................. E04D 7/00
52/302.1
4,439,955 A 4/1984 Freiborg
(Continued)

*Primary Examiner* — Basil S Katcheves
(74) *Attorney, Agent, or Firm* — Womble Bond Dickinson (US) LLP (57) ABSTRACT

A multi-layer cap shingle for installation along a ridge, hip, or rake of a roof includes a forward exposure area and a rear headlap area. The multi-layer cap shingle includes at least two layers of shingle material, a top layer and a bottom layer each having opposed edges. The layers are bonded together with patches of lamination adhesive adjacent their opposed edges. The bottom layer is configured with a deformation-absorbing mechanism such as a pair of slots extending from a forward edge rearwardly inboard of the lamination adhesive patches. When the multi-layer cap shingle is bent over a roof ridge, the slots of the bottom layer of shingle material narrow in width to account for the fact that the bottom layer must bend around an arc of slightly smaller radius than the top layer of shingle material. As a result, the opposed edges of the bottom and top layers of shingle material remain aligned and both edges of the top layer are laminated to the bottom layer to increase wind lift resistance of the installed multi-layer cap shingle.

21 Claims, 9 Drawing Sheets

Related U.S. Application Data (60) Provisional application No. 62/368,058, filed on Jul. 28, 2016.

(51) Int. Cl.
- *E04D 1/20* (2006.01)
- *E04D 1/00* (2006.01)
- *B32B 5/02* (2006.01)
- *B32B 7/14* (2006.01)
- *E04D 1/34* (2006.01)

(52) U.S. Cl.
CPC .............. *E04D 1/29* (2019.08); *E04D 1/3402* (2013.01); *B32B 2419/06* (2013.01); *E04D 2001/305* (2013.01); *E04D 2001/3447* (2013.01); *E04D 2001/3491* (2013.01)

(56) References Cited

U.S. PATENT DOCUMENTS

| | | | |
|---|---|---|---|
| 4,835,929 A | 6/1989 | Bondoc et al. | |
| 5,094,042 A | 3/1992 | Freborg | |
| 5,122,095 A | 6/1992 | Wolfert | |
| 5,271,201 A | 12/1993 | Noone et al. | |
| 5,288,269 A * | 2/1994 | Hansen | F24F 7/02 |
| | | | 454/365 |
| 5,377,459 A | 1/1995 | Freiborg | |
| 5,419,941 A | 5/1995 | Noone et al. | |
| 5,575,876 A | 11/1996 | Noone et al. | |
| 5,921,863 A | 7/1999 | Sells | |
| D422,095 S | 3/2000 | Thagard, III et al. | |
| 6,125,602 A | 10/2000 | Freiborg et al. | |
| 6,298,613 B1 * | 10/2001 | Coulton | E04D 3/40 |
| | | | 454/365 |
| 6,308,472 B1 | 10/2001 | Coulton et al. | |
| 6,351,913 B1 | 3/2002 | Freiborg et al. | |
| 6,361,434 B1 | 3/2002 | Brandon | |
| 6,813,866 B2 | 11/2004 | Naipawer, III | |
| 6,895,724 B2 | 5/2005 | Naipawer, III | |
| 6,981,916 B2 * | 1/2006 | Coulton | E04D 13/176 |
| | | | 454/365 |
| 7,594,363 B2 | 9/2009 | Polumbus et al. | |
| 7,604,536 B2 | 10/2009 | Coulton et al. | |
| 7,921,606 B2 | 4/2011 | Quaranta et al. | |
| 8,266,861 B2 | 9/2012 | Koch et al. | |
| 8,281,520 B2 | 10/2012 | Quaranta et al. | |
| 8,371,085 B2 | 2/2013 | Koch | |
| 8,613,165 B2 | 12/2013 | Bleil et al. | |
| 8,820,020 B2 | 9/2014 | Koch et al. | |
| 8,820,021 B2 | 9/2014 | Kalkanoglu | |
| 8,839,576 B1 * | 9/2014 | Newcomb | E04D 13/0325 |
| | | | 52/200 |
| 9,097,020 B2 | 8/2015 | Grubka et al. | |
| 9,200,453 B2 * | 12/2015 | Kerwood-Winslow | E04D 13/17 |
| 9,290,938 B2 * | 3/2016 | Kelly | E04D 13/064 |
| 9,303,410 B2 | 4/2016 | Steffes et al. | |
| 9,428,916 B2 | 8/2016 | Railkar et al. | |
| 10,196,823 B2 * | 2/2019 | Rotter | E04D 13/176 |
| 2002/0032000 A1 | 3/2002 | Lawless, III et al. | |
| 2005/0126088 A1 * | 6/2005 | Rotter | E04D 1/36 |
| | | | 52/198 |
| 2005/0193673 A1 | 9/2005 | Rodrigues et al. | |
| 2006/0096189 A1 | 5/2006 | Pavlansky et al. | |
| 2008/0220714 A1 | 9/2008 | Caruso et al. | |
| 2014/0179220 A1 * | 6/2014 | Railkar | F24S 20/69 |
| | | | 454/365 |
| 2018/0030732 A1 | 2/2018 | Duque et al. | |

\* cited by examiner

MULTI-LAYERED CAP SHINGLE WITH ENHANCED WIND PERFORMANCE AND METHOD OF MAKING SAME

REFERENCE TO RELATED APPLICATION

The present Patent Application is a continuation of previously filed, co-pending U.S. patent application Ser. No. 15/617,183, filed Jun. 8, 2017, which claims the benefit of U.S. Provisional Patent Application No. 62/368,058 filed on Jul. 28, 2016.

INCORPORATION BY REFERENCE

U.S. patent application Ser. No. 15/617,183, filed on Jun. 8, 2017, and U.S. Provisional Patent Application No. 62/368,058, filed on Jul. 28, 2016, are specifically incorporated by reference herein as if set forth in their entireties.

TECHNICAL FIELD

This disclosure relates generally to architectural asphalt roofing shingles and more specifically to multi-layered cap shingles for covering a ridge, hip, or rake of a shingled roof to present a look of thickness and depth.

BACKGROUND

Special cap shingles have long been used in asphalt roofing to cover or cap ridges, hips, and rakes of shingled roofs. When using simple three-tab shingles, the cap shingles often are cut from full shingles such that the individual tabs become the exposure areas of the cap shingles along a ridge or hip of a roof. In recent years, so-called architectural shingles have become highly desirable for residential roofing. Architectural shingles typically are formed of stacked layers of shingle material laminated together, shaped, and shaded to present a thicker and more textured look on a roof. For example, the well-known "dragon tooth" shingle design has a lower layer of shingle material with an upper layer bonded thereto to form a two layer shingle. The upper layer is cut to define irregular tabs known as dragon teeth. This, along with strategic shading with protective granules presents an aesthetically pleasing and desirable textured appearance on a roof.

With the growth in popularity of architectural shingles came a demand for cap shingles that complement the thick textured appearance of a roof covered with architectural shingles. Such cap shingles could no longer simply be cut from full singles as they had been with simple three-tab shingles. Accordingly, special purpose cap shingles have been developed for covering ridges, hips, and rakes of a roof. These cap shingles generally also are multi-layered in nature. Some are formed by folding portions of a blank onto other portions to form multiple layers and provide increased thickness. In other cases, architectural cap shingles are fabricated by laminating two or more layers of shingle material together to obtain thickness and the appearance of depth and texture along a ridge, hip, or rake of a roof.

One issue inherent in multi-layer cap shingles arises from the fact that they must be bent to be installed along a ridge, hip, or rake. Since the layers of such cap shingles lie in slightly different juxtaposed planes, their upper layers must bend around an arc with a slightly larger radius than the lower layers. As a result, the layers must be able to move with respect to one another as the cap shingle is bent to accommodate the different arcs around which they must extend. One solution to this requirement has been a multi-layered cap shingle with layers that are laminated together along only one side. This allows the upper and lower layers of the cap shingle to slide with respect to one another when the cap shingle is bent.

While this solution has been somewhat successful, it nevertheless has certain problems and shortcomings inherent in its construction. It has been discovered, for instance, that cap shingles laminated only on one side exhibit disappointing wind lift resistance on the side where the layers are not laminated together. Furthermore, since the layers of the cap shingle slide relative to one another when the shingle is bent, the edges of the shingle on the un-laminated side often become misaligned when the cap shingles are installed. More specifically, the layers of ridge cap shingles bent to accommodate a steeper sloped roof slide more relative to one another when bent than do ridge cap shingles bent to accommodate a less steeply sloped roof. Since it would not be feasible to fabricate cap shingles for all possible roof slopes, a compromise is struck and there is almost always a difference between the alignment of the layer edges on the un-laminated sides of installed cap shingles. Also, the layers on the un-laminated side do not always lay flat against one another. Some consider this unsightly.

A need exists for a multi-layered architectural cap shingle that exhibits superior wind lift resistance along both edges of the shingle. A related need exists for a multi-layered cap shingle that retains the same degree of alignment of the opposed edges of its layers along both edges of the shingle regardless of the angle through which the shingle must be bent to accommodate a particular roof pitch. A need also exists for a multi-layered cap shingle having layers that are flat against one another and flush when the shingle is installed. It is to the provision of a multi-layered cap shingle that addresses these and other needs that the present invention is primarily directed.

SUMMARY

Briefly described, a multi-layered cap shingle comprises multiple layers of shingle material laminated together along both edges of the shingle, at least in the exposure area. Lower layers of the shingle have relief features in the form of deformation absorption mechanisms. The relief features allow these lower layers to narrow slightly as the shingle bends around an arc with the upper layers of the shingles bending around a slightly larger arc than the lower layers. This, in turn, lends flexibility to the multi-layer shingle allowing it to bend over a ridge or hip easily as if it had only one layer. Further, the layers remain aligned along both of the opposed edges of the shingle regardless of the slope of a roof being accommodated. Since laminating adhesive bonds the layers along both side edges of the shingle, at least in the exposure areas, the layers lay flat atop with one another. The upper layer cannot rise up away from the lower layer.

Perhaps most salient, however, is that wind lift resistance is very good along both of the exposed side edges of the multi-layer cap shingle. The deformation absorption mechanisms that allow the upper layer to bend around a slightly larger arc than the lower layer may comprise spaced longitudinal slots formed in the exposure areas of the lower layer. Alternatively, the lower layers may be completely discontinuous and the discontinuities may be spanned with strips that flex or that bunch together when the shingle is bent to absorb relative movement between the layers.

Accordingly, a multi-layer cap shingle is disclosed that has superior wind lift resistance on all sides, that does not exhibit misalignment of the layers along either of the opposed side edges of the layers of the shingle, that has layers that lay flat and flush on one another when the shingle is installed, and that exhibits superior wind resistance. These and other features, aspects, and advantages of the multi-layer cap shingle of this disclosure will be better appreciated upon review of the detailed description set forth below taken in conjunction with the accompanying drawing figures, which are briefly described as follows.

DETAILED DESCRIPTION

Figure 1:
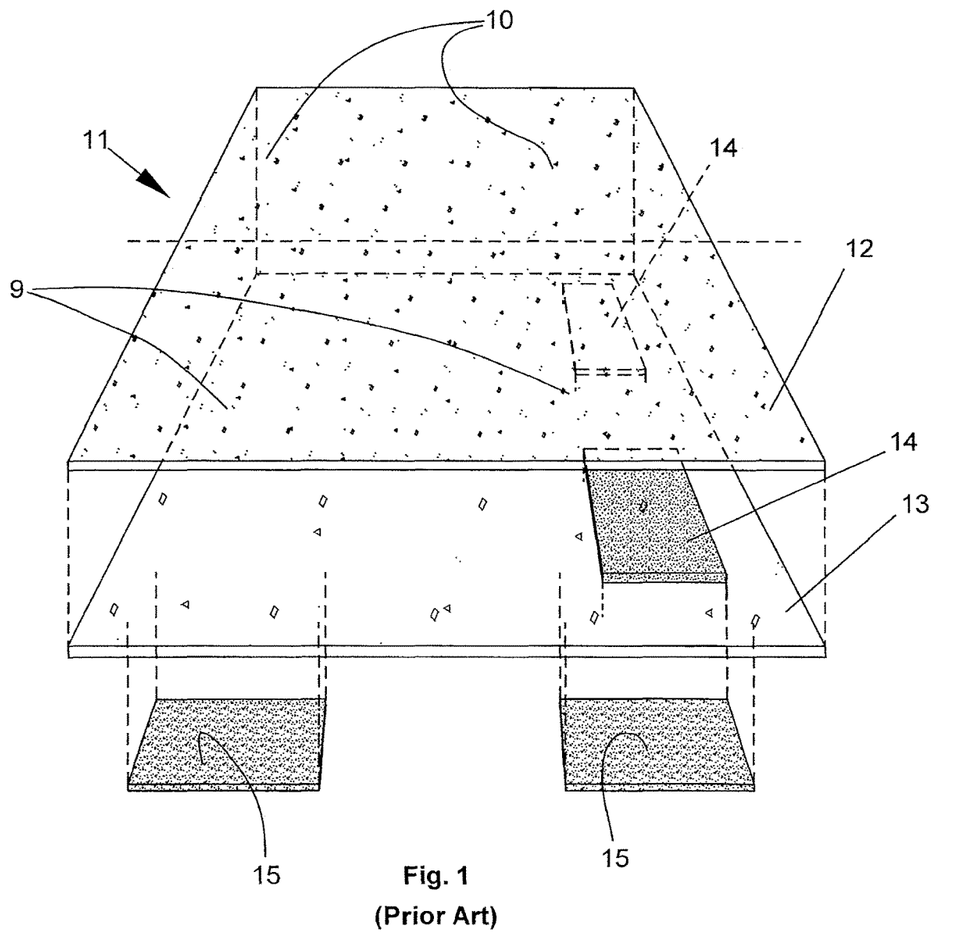
FIG. 1 is a perspective exploded view of a prior art multi-layer cap shingle showing the layers adhered on only one side.
Figure 2:
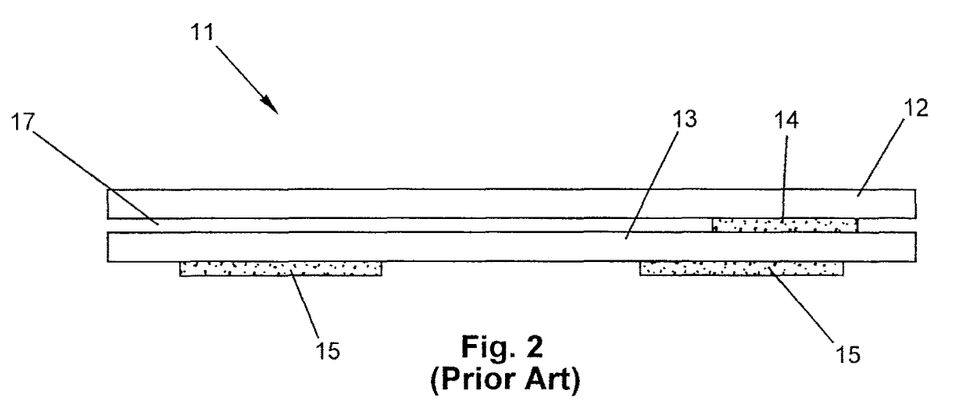
FIG. 2 is an end view of the cap shingle of FIG. 1 with the shingle assembled for installation.
Figure 3:
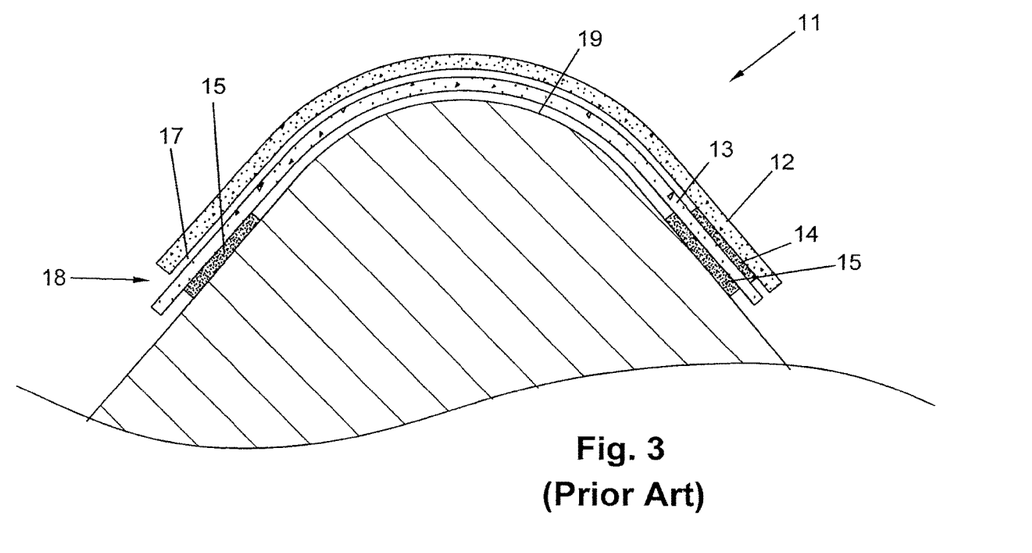
FIG. 3 shows the prior art cap shingle of FIGS. 1 and 2 installed along a ridge cap and illustrates problems and shortcomings of the prior art.

Reference will now be made to the attached drawing figures, wherein like reference numerals indicate like parts throughout various ones of the views. FIGS. 1-3 illustrate a typical prior art multi-layer cap shingle. The prior art multi-layer cap shingle 11 includes a top layer of shingle material 12 and a bottom layer of shingle material 13 each having opposed side edges. The top and bottom layers 12 and 13 overlie one another and are laminated together along one of their respective edges by a laminating adhesive 14, which can be asphalt or any other appropriate adhesive.

The opposite edges of the top and bottom layers are not laminated together so that the layers of shingle material are free to slide with respect to one another except wherein they are laminated together. The prior art multi-layer cap shingle, which is generally rectangular in shape, has an exposure area 9 and a headlap area 10 (FIG. 1). When a plurality of multi-layer cap shingles are installed along a ridge, the exposure area of each multi-layer cap shingle overlies the headlap area of an adjacent one of the multi-layer cap shingles in "piggyback" fashion. Sealant patches 15 may be applied along a forward edge of the bottom layer of shingle material. These sealant patches adhere the multi-layer cap shingle to the underlying headlap area of an adjacent multi-layer cap shingle when the shingles are installed along a ridge, hip, or rake of a roof.

The prior art multi-layer cap shingle of FIGS. 1-3 is installed along a ridge of a roof by being bent around an arc to extend over the ridge. The arc is more extreme for higher pitched roofs such as a 12/12 pitch than for lower pitched roofs such as an 8/12 pitch. This bending is illustrated in FIG. 3. The top layer and the bottom layer each bend to span the roof ridge. However, the top layer must extend around an arc of slightly greater radius and slightly greater length than the bottom layer since the top layer is further from the axis of curvature. The purpose of the un-laminated edges of the top and bottom layers is to accommodate this difference by allowing the top layer to slide relative to the bottom layer as the shingle is bent. This is illustrated at 18 in FIG. 3, where the edge of the top layer 12 has become inwardly displaced from the edge of the bottom layer 13.

Relative sliding displacement of the top and bottom layers of the multi-layer cap shingle upon installation has long been a problem with prior art multi-layer cap shingles. The top and bottom layers of prior art multi-layer cap shingles are left un-laminated along one edge specifically to allow for relative sliding movement of the top and bottom layers as they are bent over a roof ridge. However, some designers and homeowners consider it unsightly for one edge (the laminated edge) of the cap shingles to have aligned layers when the opposite edge (the un-laminated edge) has layers that are misaligned along the edge. Furthermore, the fact that the layers are not laminated along one edge renders prior art multi-layer cap shingles less resistant to uplift as a result of wind from the direction of the un-laminated edges. The present invention, detailed below, addresses both of these problems.

Figure 4:
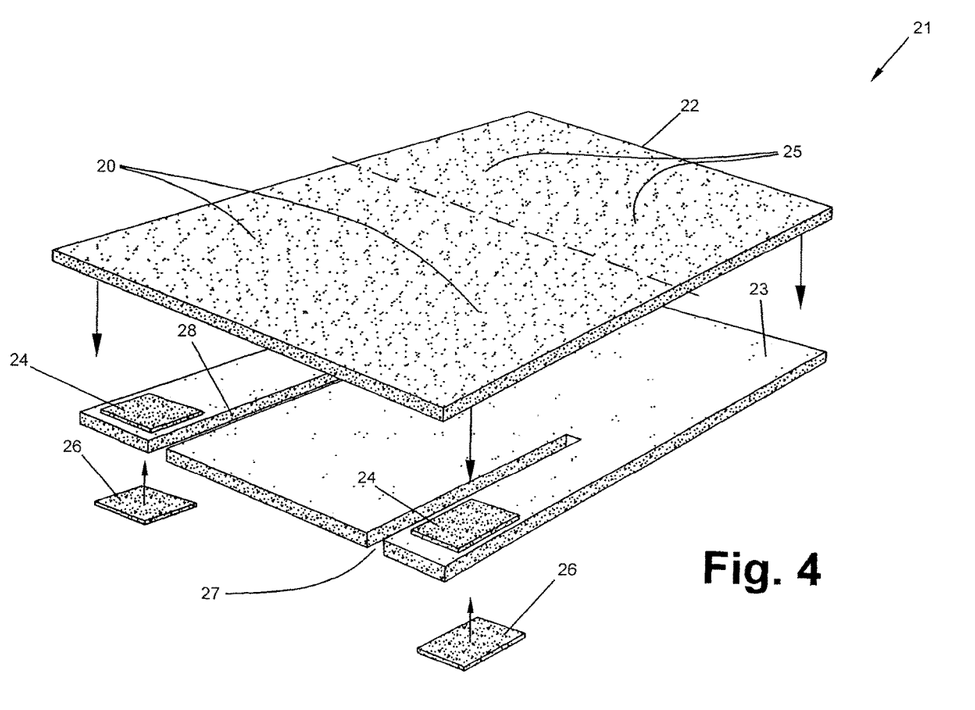
FIG. 4 is a perspective exploded view of a multi-layer cap shingle that embodies principles of the present invention in one preferred form.
Figure 5:
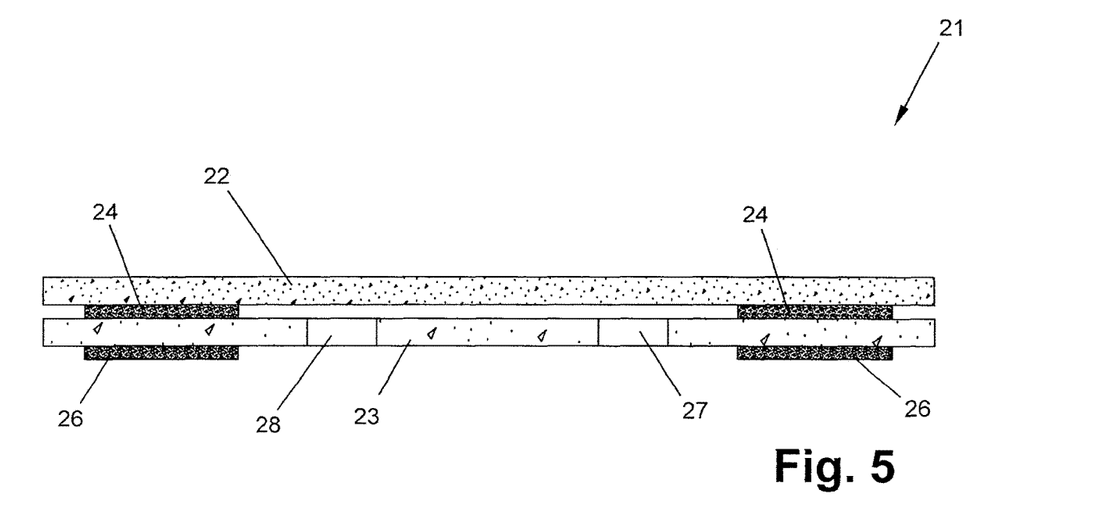
FIG. 5 is a front edge view of the multi-layer cap shingle of FIG. 4 assembled for installation.
Figure 6:
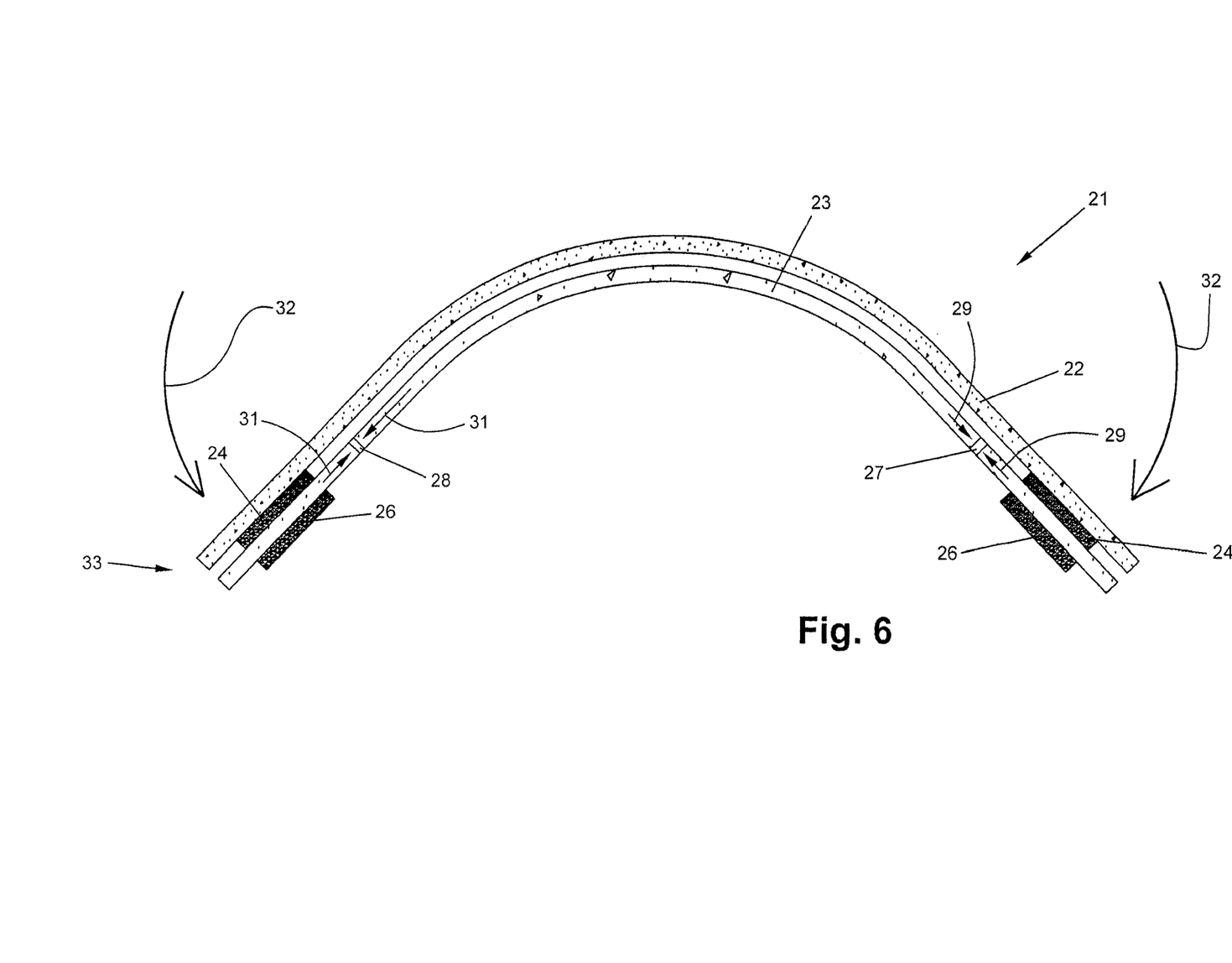
FIG. 6 is a front edge elevation of the multi-layer cap shingle of FIG. 5 as it appears when bent over a ridge of a roof.

FIGS. 4-6 illustrate an improved multi-layer cap shingle that embodies principles of the present invention in one exemplary form. Referring first to FIG. 4, the multi-layer cap shingle 21 includes a top layer 22 of shingle material and a bottom layer 23 of shingle material. The shingle 21 has an exposure area 20 and a headlap area 25. As is traditional, the headlap area of the multi-layer cap shingle 21 will be overlapped by the exposure area of an adjacent multi-layer cap shingle in piggyback fashion when a plurality of shingles is installed along the ridge of a roof. The bottom and top layers are laminated together by means of laminating adhesive 24 positioned between the two layers. More specifically, a patch of laminating adhesive 24 is applied between the layers adjacent the two opposed edges at least in the exposure area 20 as shown. Sealant patches 26 may be applied to the lower surface of the bottom layer 23 to adhere the exposure area 20 to the underlying headlap area of an adjacent multi-layer cap shingle in an installation of shingles along a ridge.

The bottom layer 23 of the multi-layer cap shingle 21 includes a relief feature or deformation-absorbing mechanism located between the two patches of laminating adhesive 24. In the embodiment of FIG. 4, the deformation-absorbing mechanism is configured as two slots 27 and 28 that extend from the forward edge of the bottom layer of shingle material rearwardly toward the headlap area 25. In this embodiment, there is no laminating adhesive in the region between the two slots. FIG. 5 is a forward edge plan view of the embodiment of FIG. 4 illustrating the top layer 22, the bottom layer 23, laminating adhesive patches 24, and sealant patches 26. The open ends of the slots 27 can be seen. It should be noted that in FIG. 5 and most of the drawing figures, the thicknesses and spacing of components are exaggerated for clarity. In reality, the top and bottom layers are closely juxtaposed and the shingle material, laminating adhesive, and sealant patches are thinner than depicted.

FIG. 6 shows the multi-layer cap shingle 21 being bent around an arc as illustrated by arrows 32 in the manner in which it is bent when installed along the ridge of a roof. As with the prior art described above, the top layer must bend around an arc of slightly larger radius and slightly longer length than the bottom layer. Said another way, the bottom layer must bend around an arc of slightly smaller radius and slightly smaller length. Accordingly, the bottom layer must decrease in width slightly if the edges of the two layers are to remain aligned. In the illustrated embodiment, both edges of the top and bottom layer are laminated together with laminating adhesive 24 in the exposure area of the cap shingle. Accordingly, these edges are fixed relative to one another and cannot become misaligned as the multi-layer cap shingle is bent around the arc.

To absorb the decrease in width, i.e. the deformation, of the bottom layer 23, the slots 27 and 28 narrow progressively as the multi-layer cap shingle 21 is bent. This is indicated by arrows 29 and 31 in FIG. 6. As a result, the multi-layer cap shingle can be bent easily around the arc since the bottom layer becomes slightly narrower during the process and does not resist the bending. In other words, the slots 27 and 28 that comprise the deformation-absorbing mechanism absorb the reduction in width of the bottom layer by narrowing as the multi-layer cap shingle 21 is bent. As a result, the edges of the top and bottom layers remain aligned with each other regardless of the radius of the arc. This presents a more aesthetically pleasing cap shingle installation than traditional prior art multi-layer cap shingles wherein one edge of the top layer 22 becomes misaligned with the corresponding edge of the bottom layer 23 as described above.

An additional significant advantage of the multi-layer cap shingle of this invention arises from the fact that the bottom and top layers 22 and 23 are laminated together with laminating adhesive 24 adjacent both side edges at least in the exposure area of the cap shingle. As a result, the multi-layer cap shingle is highly resistant to wind lift along both of its edges. This, in conjunction with the sealing of the shingle to an underlying shingle by means of sealant patches 26, makes an installation of multi-layer cap shingles very stable and wind resistant.

Figure 7A:
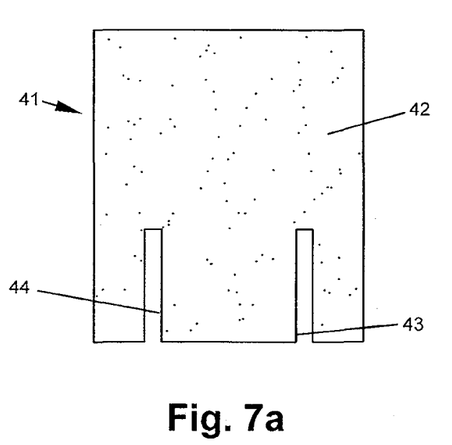
FIGS. 7a-7d are plan views of the bottom layer of a multi-layer cap shingle according to the invention showing various embodiments of the relief features or deformation-absorbing mechanisms incorporated in the lower layer.

FIGS. 7a-7d show in plan views other examples of how the deformation-absorbing mechanism in a lower layer of a multi-layer cap shingle may be implemented. These examples are not intended to be exhaustive or limiting. Any feature in the bottom layer of the multi-layer cap shingle that permits the bottom layer to narrow in width should be construed to be within the scope of the present invention. FIG. 7a shows a bottom layer of shingle material 41 having a surface 42. In this example, two parallel slots 43 and 44 extend from the forward edge of the bottom layer rearwardly within the exposure area of the layer. As discussed above, these slots 43 and 44 narrow when a multi-layer cap shingle incorporating the bottom layer 41 is bent around an arc to absorb the deformation or narrowing of the bottom layer relative to the top layer.

Figure 7B:
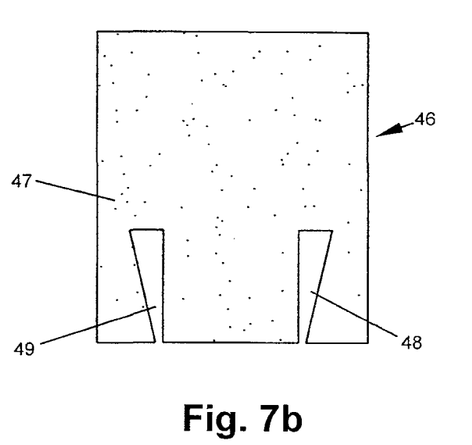
Figure 7C:
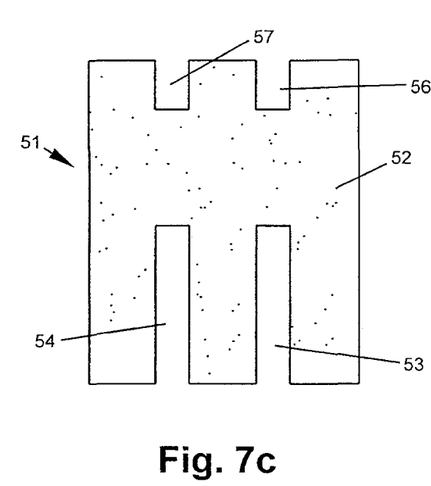

Similarly, FIG. 7b illustrates a deformation-absorbing mechanism in the form of two generally trapezoidal cutouts 48 and 49 that widen from the forward edge of the bottom layer 46 in the exposure area. This configuration can improve the deformation-absorbing capability and/or improve the flexibility of the multi-layer cap shingle without exposing large gaps along the forward edge of the shingle. FIG. 7c shows an example of a bottom layer 51 of shingle material wherein the deformation-absorbing mechanism comprises a pair of slots 53 and 54 in the exposure area of the layer and a pair of slots 56 and 57 in the headlap area of the layer. The addition of slots 56 and 57 in the headlap area makes the resulting multi-layer cap shingle lighter and more easily bent. The slots 53 and 54 in the exposure area increases flexibility and allows the bottom layer 51 to narrow in width as the multi-layer cap shingle is bent around an arc.

Figure 7D:
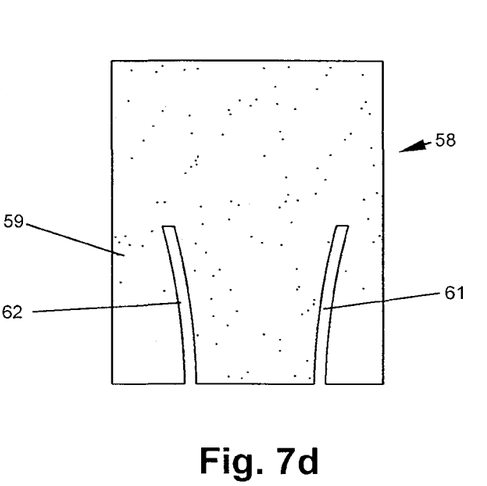

FIG. 7d illustrates another embodiment of the deformation-absorbing mechanism in the form of two curved slots 61 and 62 formed in the bottom layer 58 within the exposure area. The curve of the slots is predetermined to follow the amount of deformation experienced by the bottom layer as the multi-layer cap shingle is bent over the ridge of a roof. The bending deformation increases from the center of rotation (the roof ridge point) to the far edge of the multi-layer cap shingle as the shingle is applied. Further, since the shingles are installed in piggyback fashion, the arc of curvature at the front edge of the shingle is somewhat larger than the arc of curvature at the back edge of the shingle. The curved configuration of the deformation-absorbing mechanism shown in FIG. 7d takes these factors into account such that the bending deformation in the bottom layer is completely absorbed without creating stress points in the bottom layer.

Figure 8:
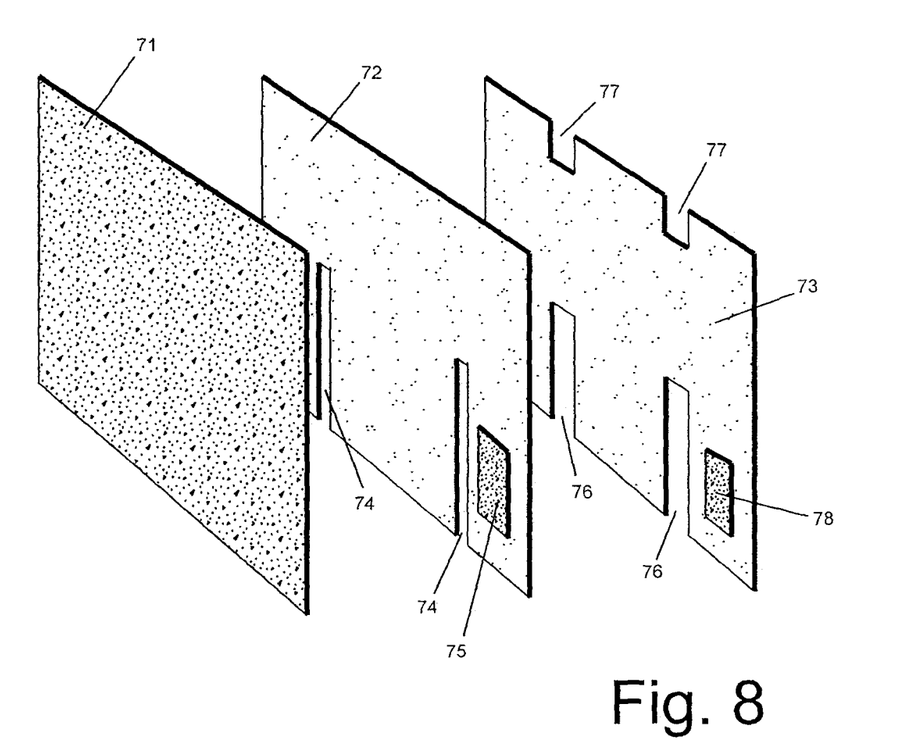
FIG. 8 is a perspective exploded view of a multi-layer cap shingle made up of three layers and showing incorporation of a deformation-absorbing mechanism in the bottom two layers.

FIG. 8 illustrates a multi-layer cap shingle comprising three layers of shingle material; a top layer 71, a middle layer 72, and a bottom layer 73. The middle layer 72 incorporates the deformation-absorbing mechanism of FIG. 7a comprising spaced slots 74. The bottom layer 73 incorporates the deformation-absorbing mechanism of FIG. 7c comprising slots 76 in the exposure area and slots 77 in the headlap area. The bottom layer 73 is laminated to the middle layer in the exposure area by laminating adhesive 78 and the middle layer 72 is laminated to the top layer by laminating adhesive 75. When this three-layer cap shingle is bent around an arc, the middle layer and the bottom layer narrow in width as necessary to absorb the resulting relative deformations. The bottom layer narrows more than the middle layer because each must extend around an arc of a different radius and length.

Figure 9:
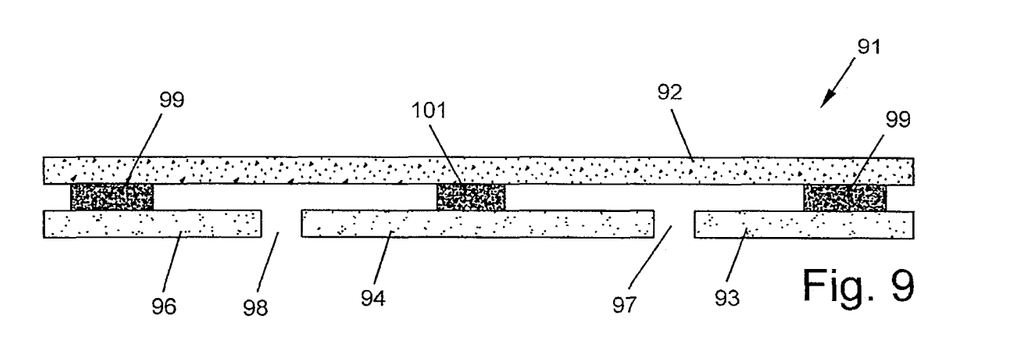
FIG. 9 is a front edge elevation showing another embodiment of a multi-layer cap shingle according to the invention.
Figure 10:
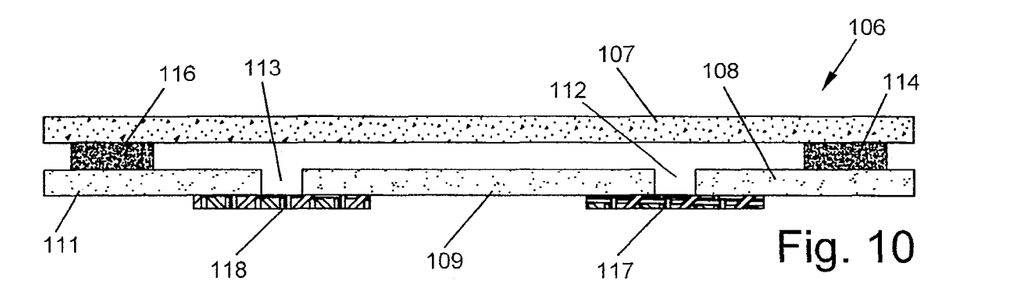
FIG. 10 is a front edge elevation showing another embodiment of a multi-layer cap shingle according to the invention.
Figure 11:
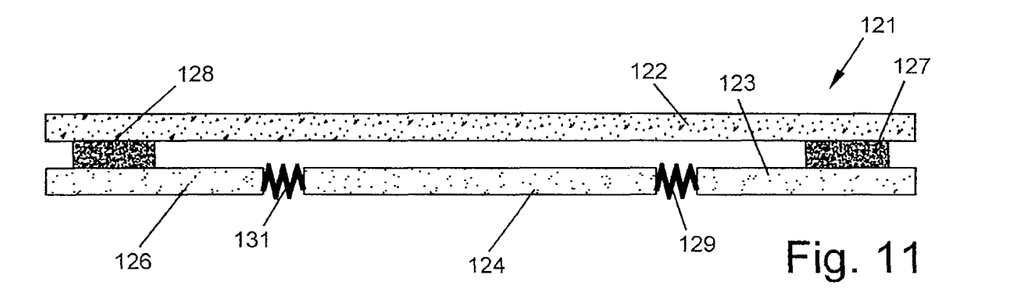
FIG. 11 is a front edge elevation showing yet another embodiment of a multi-layer cap shingle according to the invention.

FIGS. 9-11 illustrate further embodiments of a multi-layer cap shingle exemplifying the present invention. FIG. 9 shows a multi-layer cap shingle 91 comprising a top layer 92 of shingle material laminated to a discontinuous bottom layer of shingle material. The discontinuities are defined by slots that extend completely from the front edge of the bottom layer to the back edge of the bottom layer. The bottom layer thus comprises a first outer edge portion 93, a central portion 94, and a second outer edge portion 96. Discontinuities 97 and 98 extend along the entire length of the bottom layer from its forward edge to its rear edge thus separating the three portions. The first edge portion 93 is laminated to the top layer 92 via laminating adhesive 99; the central portion 94 is laminated to the top layer 92 via laminating adhesive 101; and the second edge portion 96 is laminated to the top layer 92 via laminating adhesive 99. When the multi-layer cap shingle of this embodiment is bent around an arc for installation, the discontinuities narrow along the entire length of the bottom layer from front to back. Further, changing arc radius and length from the front to the back of the shingle in a piggyback installation is fully compensated. This makes the multi-layer cap shingle very flexible and adaptable and maintains the edges of the bottom layer aligned with the edges of the top layer.

FIG. 10 illustrates yet another embodiment of the present invention. As in the embodiment of FIG. 9, FIG. 10 illustrates a multi-layer cap shingle 106 having a top layer of shingle material 107 and a bottom layer of shingle material comprising a first edge portion 108, a central portion 109, and a second edge portion 111 separated by discontinuities 112 and 113. The first and second edge portions 108 and 111 are laminated to the top layer 107 by means of laminating adhesive 114 and 116 respectively. Unlike the embodiment of FIG. 9, the central portion 109 is not laminated to the top layer 107. Instead, it is attached to the first and second edge portions by strips of flexible material 117 and 118 that span the discontinuities and are bonded to the lower layer. The strips 117 and 118 may be made of any suitably flexible material such as a woven or non-woven fabric, a polymer, rubber, or other material. When the multi-layer cap shingle 106 of FIG. 10 is bent around an arc, the flexible strips 117 and 118 flex and deform as necessary to allow the discontinuities to narrow and absorb the narrowing deformation of the bottom layer relative to the top layer.

FIG. 11 illustrates an alternate embodiment of a multi-layer cap shingle 121 that is similar to the embodiment of FIG. 10 in that it has a top layer 122 and a bottom layer made up of first and second edge portions 123 and 126 and a central portion 124. In this embodiment, strips of accordion-folded material 129 and 131 span the discontinuities and attach the central portion 124 to the edge portions 123 and 126. When the multi-layer cap shingle of this embodiment is bent around an arc, the accordion folded strips 129 and 131 compress as necessary to allow the discontinuities to narrow and skew as necessary to absorb the deformation of the bottom layer.

The invention has been described herein in terms of various embodiments and configurations that represent examples of configurations that the invention might take and that represent the best modes of carrying out the invention. It will be understood, however, that a wide range of additions, deletions, and modifications, both subtle and gross, might well be made to the illustrated embodiments and further that entirely different embodiments may be conceived, all without departing from the spirit and scope of the invention, which id delineated only by the claims.

What is claimed is:

1. A shingle comprising:
   an upper layer of shingle material configured to bend in an arc for installation along the ridge, hip, or rake of the roof and having first and second side edges, a front edge, a back edge; an exposure portion adjacent the front edge, and a headlap portion adjacent the back edge;
   a lower layer of shingle material underlying the upper layer and configured to bend in an arc with the upper layer during installation, the lower layer having a front edge, a back edge, a first side edge substantially aligned with the first side edge of the top layer of shingle material, and a second side edge substantially aligned with the second side edge of the top layer of shingle material;
   an adhesive applied between the lower and upper layers of shingle material adjacent the aligned first and second side edges of the lower and upper layers;
   a slot formed completely through the lower layer of shingle material and extending from a front edge of the lower layer toward the rear edge of the lower layer, the slot configured to enable the lower layer of shingle material to bend in an arc that has a radius less than a radius along which the upper layer is bent;
   wherein portions of the adhesive applied between the lower and upper layers of shingle material are positioned between the slot and each of the aligned first and second edges of the lower and upper layers;
   wherein the upper layer of shingle material and the lower layer of shingle material comprise asphalt; and
   wherein the shingle comprises a multi-layer cap shingle configured for installation along a ridge, hip or rake of a roof.

2. The shingle as claimed in claim 1 wherein the slot is located adjacent the first or second side edge of the lower layer of shingle material.

3. The shingle as claimed in claim 1 wherein the slot defines a discontinuity in the lower layer of shingle material extending from the front edge of the lower layer of shingle material to a location intermediate the front edge of the lower layer of shingle material and the back edge of the lower layer of shingle material.

4. The cap shingle as claimed in claim 1 wherein the slot has a generally rectangular, trapezoidal or curved shape.

5. The cap shingle as claimed in claim 1 wherein the adhesive comprises a laminating adhesive applied between the upper and lower layers.

6. The cap shingle as claimed in claim 5 wherein the laminating adhesive comprises a series of spaced apart laminating adhesive patches.

7. The cap shingle as claimed in claim 1 further comprising at least one sealant patch arranged along a bottom surface of the lower layer of shingle material.

8. The cap shingle as claimed in claim 1 further comprising a middle layer of shingle material arranged between the lower layer of shingle material and the upper layer of shingle material, the middle layer of shingle material having first and second side edges, and being bonded to the lower layer of shingle material and the upper layer of shingle material along the first and second side edges of the lower, middle, and upper layers of shingle material.

9. The shingle as claimed in claim 8, wherein the middle layer of shingle material comprises a middle layer slot formed in the middle layer and extending from a front edge of the middle layer toward a rear edge of the middle layer.

10. The shingle of claim 1, further comprising a sealant applied along a bottom surface of the lower layer of shingle material.

11. The shingle of claim 10, wherein the adhesive applied between the lower and upper layers of shingle material comprises a plurality of patches of adhesive adjacent the aligned side edges of the lower and upper layers of shingle material; and wherein the sealant applied along a bottom surface of the lower layer of shingle material comprises plurality of patches of sealant arranged at spaced locations along the bottom surface of the lower layer of shingle material.

12. The shingle of claim 11, wherein the plurality of patches of adhesive comprises at least 2 patches of adhesive each positioned on an opposite side of the slot; and wherein the plurality of patches of sealant comprises at least two patches of sealant each positioned on an opposite side of the slot.

13. The shingle of claim 1, wherein the adhesive applied between the lower and upper layers of shingle material comprises at least 4 patches of adhesive arranged at spaced locations between the lower and upper layers of shingle material, with at least two of the patches of adhesive arranged adjacent the aligned first and second side edges of the lower and upper layers of shingle material on opposite sides of the slot.

14. The shingle of claim 1, wherein the adhesive applied between the lower and upper layers of shingle material comprises a plurality of patches of adhesive, and wherein at least two patches of adhesive are applied between the lower and upper layers of shingle material adjacent the aligned first and second side edges thereof and opposite the exposure portion of the upper layer; and wherein at least one patch of a sealant is applied along a bottom surface of the lower layer of shingle material opposite the exposure portion of the upper layer and is configured to adhere the lower layer to a headlap portion of an adjacent cap shingle.

15. A shingle the shingle comprising:
   a bottom layer of shingle material having a front edge, rear edge and opposed side edges,
   a top layer of shingle material having opposed side edges substantially aligned with the opposed side edges of the bottom layer of shingle material,
   an adhesive applied between the bottom and top layers of shingle material, and
   a slot formed in the bottom layer of shingle material and extending from the front edge of the bottom layer toward the rear edge of the bottom layer, the slot configured to enable the bottom layer of shingle material to bend in an arc that has a radius less than a radius of an arc about which the top layer of shingle materials is bent;
   wherein the adhesive applied between the lower and upper layers of shingle material is positioned on opposite sides of the slot and adjacent the aligned first and second side edges of the lower and upper layers;
   wherein the top layer of shingle material and the bottom layer of shingle material comprise asphalt; and
   wherein the shingle comprises a multi-layer cap shingle configured for installation along a ridge, hip or rake of a roof.

16. The shingle as claimed in claim 15, further comprising sealant along a lower surface of the bottom layer of shingle material for sealing the multi-layer shingle to an adjacent like multi-layer shingle when the multi-layer shingles are installed along the ridge, hip, or rake of a roof in partially overlapping fashion.

17. The shingle as claimed in claim 15 wherein the slot is located adjacent the first or second side edge of the bottom layer of shingle material.

18. The shingle as claimed in claim 15 wherein the slot defines a discontinuity in the bottom layer of shingle material extending from the front edge of the bottom layer of shingle material to a location intermediate the front edge of the bottom layer of shingle material and the back edge of the bottom layer of shingle material.

19. The shingle as claimed in claim 15 further comprising a middle layer of shingle material having opposed side edges, the middle layer of shingle material disposed between the bottom layer of shingle material and the top layer of shingle material with its opposed side edges substantially aligned with the opposed side edges of the bottom layer of shingle material and the opposed side edges of the top layer of shingle material, and a middle layer slot formed in the middle layer of shingle material and configured to enable the middle layer of shingle material to narrow as the multi-layer shingle is bent over a ridge, hip, or rake of a roof to maintain the alignment of the opposed side edges of the bottom, middle, and top layers of shingle material while allowing the bottom layer of shingle material and the middle layer of shingle material to bend around smaller arcs than the top layer of shingle material.

20. The shingle of claim 15, wherein the adhesive applied between the lower and upper layers of shingle material comprises a plurality of patches of adhesive, at least one patch of adhesive positioned between the slot and each of the aligned side edges of the lower and upper layers of shingle material; and further comprising a plurality of patches of a sealant arranged at spaced locations along the bottom surface of the lower layer of shingle material and on opposite sides of the slot.

21. The shingle of claim 15, wherein the adhesive applied between the lower and upper layers of shingle material comprises at least 4 patches of adhesive arranged at spaced locations between the lower and upper layers of shingle material, with at least two of the patches of adhesive arranged adjacent the aligned first and second side edges of the lower and upper layers of shingle material on opposite sides of the slot.

* * * * *